United States Patent [19]

Robinson et al.

[11] Patent Number: 5,616,912
[45] Date of Patent: Apr. 1, 1997

[54] THREE DIMENSIONAL IMAGING APPARATUS, CAMERA, AND MICROSCOPE USING DISCRETE SHUTTER CONTROL TO PRODUCE PARALLAX FOR OBTAINING THREE DIMENSIONAL IMAGES

[75] Inventors: Michael G. Robinson; Craig Tombling, both of Oxfordshire; Paul May, Cambridge; David Ezra; Graham J. Woodgate, both of Oxfordshire, all of United Kingdom

[73] Assignee: Sharp Kabushiki Kaisha, Osaka, Japan

[21] Appl. No.: 310,853

[22] Filed: Sep. 22, 1994

[30] Foreign Application Priority Data

Sep. 23, 1993 [GB] United Kingdom .................... 9319619

[51] Int. Cl.⁶ ........................................................ G01J 1/20
[52] U.S. Cl. ................................... 250/201.1; 250/201.3; 359/316
[58] Field of Search ........................... 250/201.1, 208.1, 250/216, 226, 229, 201.9, 550, 556; 348/340, 362, 363, 343, 344; 359/315, 316, 224, 223, 212–215; 354/402, 404; 235/462, 472, 207.3

[56] References Cited

U.S. PATENT DOCUMENTS

| | | | |
|---|---|---|---|
| 3,932,699 | 1/1976 | Tripp | 348/59 |
| 4,367,486 | 1/1983 | Eichenlaub | 348/42 |
| 4,383,170 | 5/1983 | Takagi et al. | 250/208.1 |
| 4,675,535 | 6/1987 | Tsunekawa et al. | 250/208.1 |
| 4,682,235 | 7/1987 | Chism, Jr. | 250/208.1 |
| 4,790,632 | 12/1988 | Miyakawa et al. | 359/40 |
| 4,798,448 | 1/1989 | Raalti | 359/41 |
| 5,448,395 | 9/1995 | Lopez et al. | 359/224 |

FOREIGN PATENT DOCUMENTS

| | | |
|---|---|---|
| 0029568 | 6/1981 | European Pat. Off. . |
| 0335282 | 10/1989 | European Pat. Off. . |
| 62-262820 | 11/1987 | Japan . |
| 2284902 | 8/1995 | United Kingdom . |

OTHER PUBLICATIONS

White et al, *Journal of Applied Physics*, vol. 45, No. 11, Nov. 1974, "New Absorbtive Mode Reflective Liquid Crystal Display Device"., pp. 4718–4723.

Primary Examiner—Que Le

[57] ABSTRACT

A three dimensional imaging apparatus may be used as a microscope or camera. The apparatus includes an array of lenses, each of which is aligned with a respective photodetector element. A liquid crystal spatial light modulator has several pixels between each photodetector element and lens. A control circuit controls the modulator so that the pixels in front of each photodetector element act as a moving shutter. The outputs of the photodetector elements are processed and stored to form a three dimensional image.

16 Claims, 3 Drawing Sheets

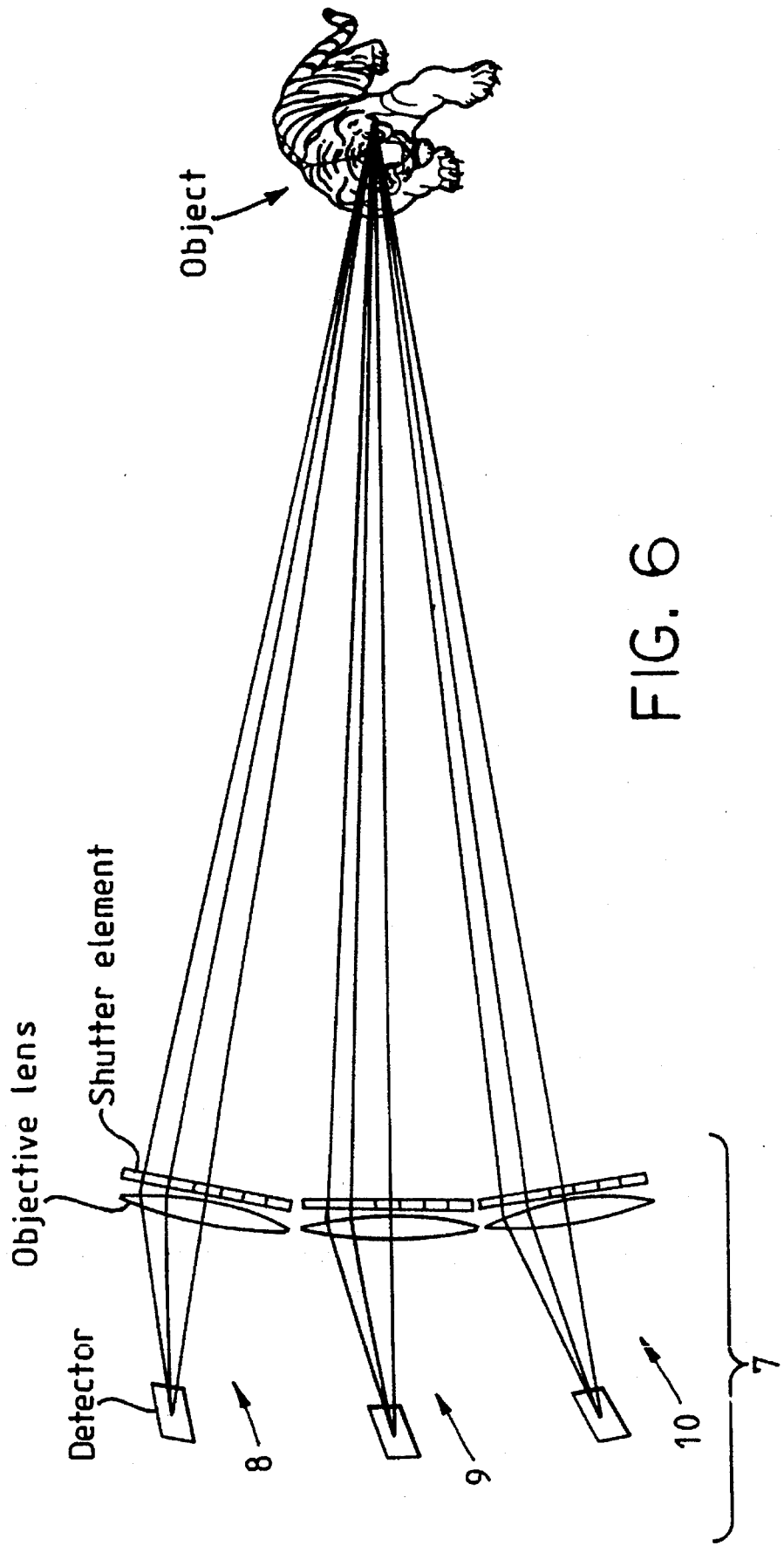

THREE DIMENSIONAL IMAGING APPARATUS, CAMERA, AND MICROSCOPE USING DISCRETE SHUTTER CONTROL TO PRODUCE PARALLAX FOR OBTAINING THREE DIMENSIONAL IMAGES

TECHNICAL FIELD OF THE INVENTION

The present invention relates to a three dimensional imaging apparatus and to a microscope and camera using such apparatus.

BACKGROUND OF THE INVENTION

EP 0 335 282 discloses an arrangement which functions as a three dimensional camera. An image pickup screen is disposed in the focal plane of a convex lens. A movable pin hole is provided on a surface of the convex lens and cyclically scans across the surface. In order to provide a sufficiently convincing three dimensional effect, the camera must provide parallax information over a sufficiently large angular range. This in turn requires that the convex lens have a large aperture. Such large convex lenses are, in general, far too expensive and heavy and of insufficient optical performance for a camera of this type to be practically or commercially viable. EP 0 335 282 suggests that the convex lens may be replaced by a converging Fresnel lens. However, as is well known, Fresnel lenses are unsuitable for imaging applications. Thus, EP 0 335 282 fails to disclose an arrangement which can be commercially implemented.

EP 0 029 568 discloses an arrangement for improving the resolution of an imaging device. A lens is arranged to form an image of an object on an array of photodetectors. A liquid crystal shutter is disposed between the lens and the photodetectors and is controlled so as to transmit a moving segment of the area of the optical path through the arrangement. However, EP 0 029 568 is not concerned with three dimensional imaging.

SUMMARY OF THE INVENTION

According to one aspect of the invention, there is provided a three dimensional imaging apparatus comprising: a photodetector; an optical imaging system for imaging an object onto the photodetector; a spatial optical modulator interrupting an optical path at a location between the object and the photodetector; and a control circuit for causing the spatial optical modulator selectively to transmit only a selected segment of an area of the optical path at the location, the selected segment being selected sequentially among segments across the area so that the spatial optical modulator acts as a shutter arrangement, wherein the optical imaging system comprises an array of lenses, the photodetector comprises an array of photodetector elements, each lens of the array is optically aligned with at least one of the photodetector elements, and the spatial optical modulator comprises an array of shutters, each of which is optically aligned with a respective one of the photodetector elements, and wherein each of the shutters comprises a plurality of discrete independently controllable modulation elements.

According to one embodiment, the apparatus includes another optical imaging system disposed between the object and the optical imaging system, the another optical imaging system comprising a liquid crystal device.

According to another embodiment, the spatial optical modulator defines an array of modulation elements along a first direction, and the another shutter arrangement defines an array of shutters along a second direction perpendicular to the first direction.

According to yet another embodiment, a microscope includes the three dimensional imaging apparatus and a circuit for processing a sequence of signals from the photodetector elements so as to store a three dimensional image.

According to another aspect of the invention, there is provided a three dimensional imaging microscope comprising: photodetector array; microscope lens for imaging an object onto the photodetector array; a spatial optical modulator located in substantially a same plane of the microscope lens and interrupting an optical path between the object and the photodetector array; and a control circuit for causing the spatial optical modulator selectively to transmit only a selected segment of an area of the optical path at the spatial optical modulator, the selected segment being selected sequentially among segments across the area so that the spatial optical modulator acts as a shutter arrangement, an object plane and an image plane of the lens being at finite distances from the lens.

Preferred embodiments of the invention are defined in the other appended claims.

It is thus possible to provide a compact apparatus which allows three dimensional images to be recorded by recording a sequence of two dimensional views from different directions, i.e. using angular demultiplexing. Such angular demultiplexing can be achieved without requiring large, expensive, or impractical lenses and permits the practical and commercial implementation of cameras and microscopes.

BRIEF DESCRIPTION OF THE DRAWINGS

The invention will be further described, by way of example only, with reference to the accompanying diagrammatic drawings, in which:

FIG. 6 represents a three dimensional camera with high view resolution, embodying the invention.

DETAILED DESCRIPTION OF THE PREFERRED EMBODIMENTS

In the optical imaging systems described with reference to the drawings, three dimensional images can be recorded on a sensor or detector array through the use of "angular demultiplexing", in other words recording frames from different angles. In this way, each two dimensional view, or a subset of two dimensional views; is recorded as one frame of image data taken, preferably in parallel, from a detector array. The method of obtaining such frames of data is conventional, and need not be described here. The three dimensional effect is obtained because a three dimensional image can be approximated by two or more two dimensional images that are angularly separated so as to give parallax.

The three dimensional image is stored by time multiplexing and/or by spatial multiplexing of the two dimensional images which constitute the three dimensional image; in other words, the different two dimensional images can be captured at different times as sequential frames or spatially interlaced within one frame. In the case where a single detector array is used to detect distinct, angularly-separated two dimensional images, it is likely that this implementation of the invention would be restricted to situations where there is a high angular divergence in light collected by the optical system and therefore a large range of viewpoints, such as in three dimensional microscopy.

Figure 1:
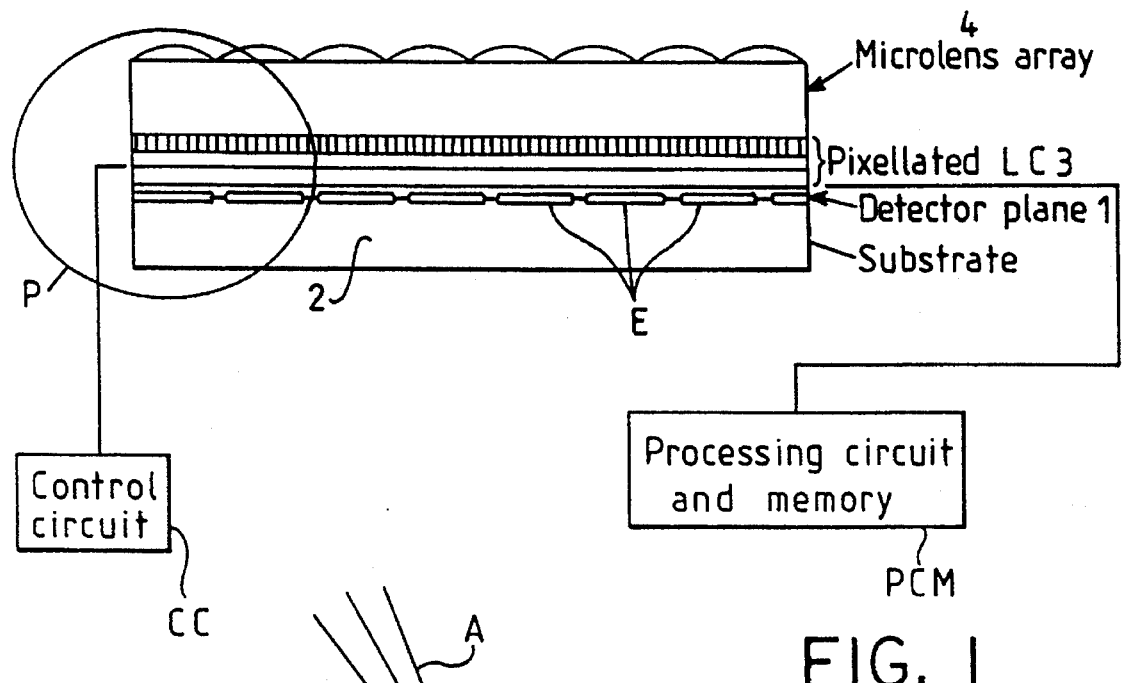
FIG. 1 is a section through an integrated electro-optical device embodying the invention.
Figure 2:
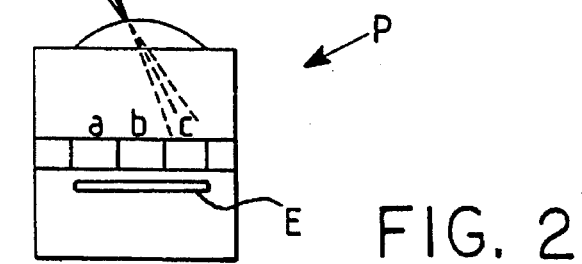
FIG. 2 is a sectional view through part of the device of FIG. 1, corresponding to one pixel of the detector array.
Figure 3:
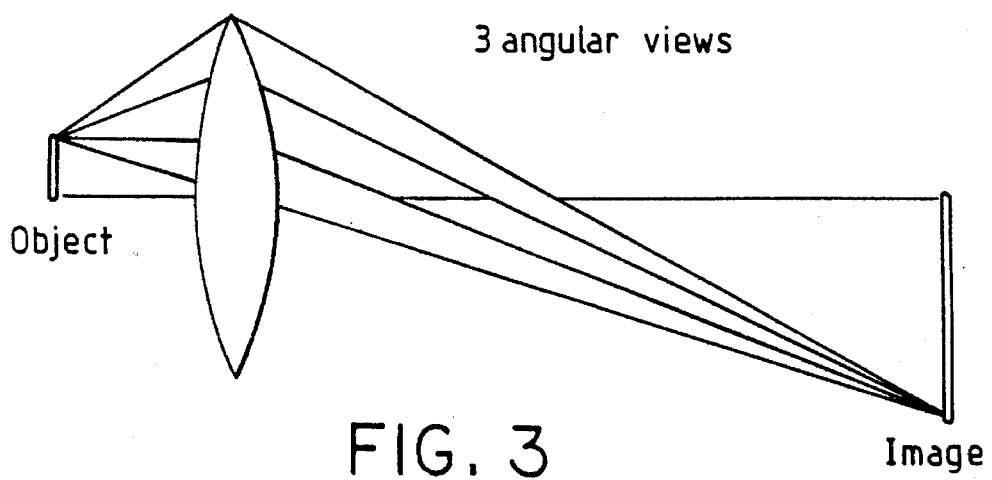
FIG. 3 is a diagram illustrating three dimensional microscopy.
Figure 4:
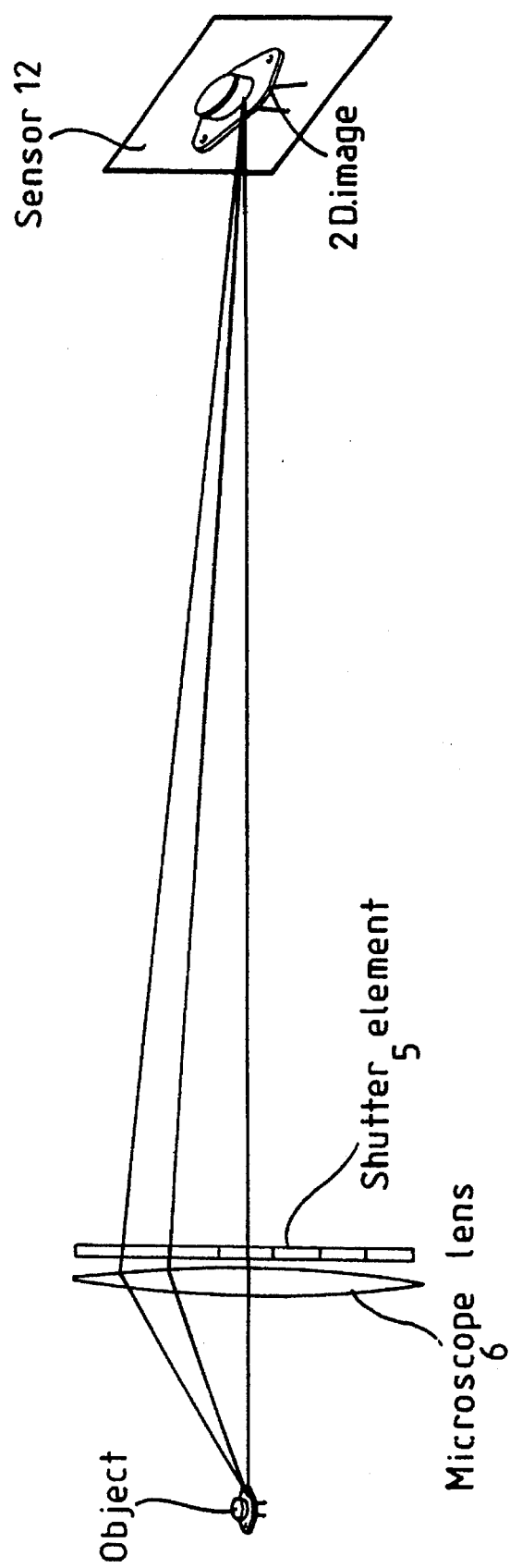
FIG. 4 is a diagram of an optical arrangement for three dimensional microscopy embodying the invention.
Figure 5:
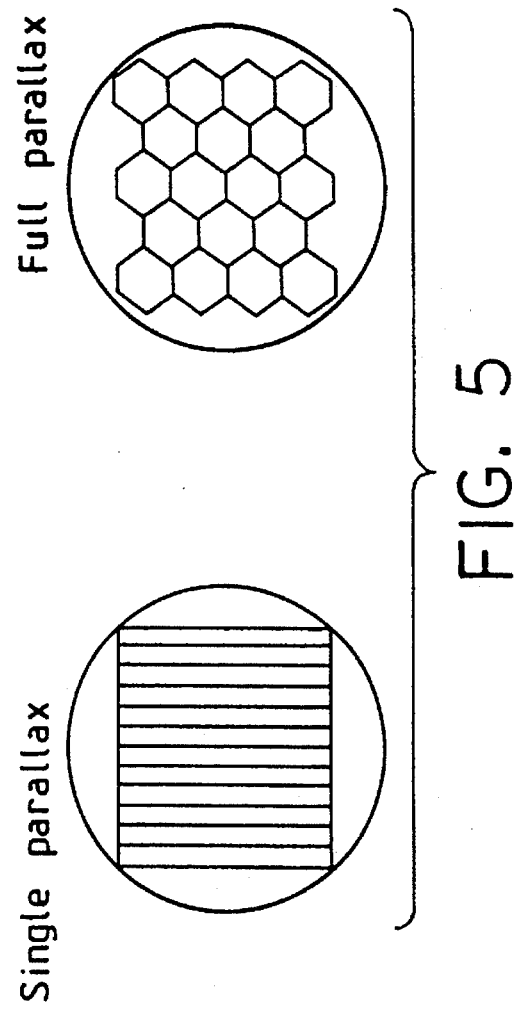
FIG. 5 is a diagram of two different arrangements for shuttering an image.

In the example shown with reference to FIGS. 1 to 3, representing three dimensional microscopy, angular demultiplexing takes place at the detector array. In the example of FIGS. 4 and 5, further angular demultiplexing takes place at the microscope lens with optical shuttering which is at relatively low spatial resolution.

Further, objects can be recorded using either single or full parallax, these options being illustrated in FIG. 5. With full parallax recording, a single parallax display can be used for rotation of the object whilst maintaining three dimensional effects through the use of suitable software. The display of stored three dimensional images is conventional, and need not be described here.

A first embodiment of the invention will now be described with reference to FIGS. 1 to 3. As described in our co-pending British Patent Application No. 9319614.5.

entitled "Integrated Electro-Optical Liquid Crystal Device", a novel device, shown in section in FIG. 1, has a detector plane 1 formed on a semiconductor substrate 2. The detector plane 1 comprises an array of detector elements E, for example charge coupled devices (CCDs), addressed by row and column electrodes in a conventional manner. A pixellated liquid crystal cell 3, controlled as a spatial optical modulator, is superposed on the detector plane 1, so that the whole device is integrated. This may comprise a ferroelectric liquid crystal (FLC) cell with row electrodes and column electrodes on its opposite faces. Preferably, as described in the co-pending patent application referred to above, the liquid crystal modulator pads, corresponding to the pixels, are in the same planes as the row and column electrodes, and preferably the modulator pads of at least one plane have the extra function of analysing the polarization of the polarized transmitted light. This polarizing element may be provided by forming the pads as combs of elongate conductive fingers. Alternatively, a pleochroic dye added to the liquid crystal would allow the polarizer to be part of the liquid crystal layer.

One pixel of the device of FIG. 1, identified by the circle P in FIG. 1, is shown to an enlarged scale in FIG. 2. For each detector element E, there are three separately controllable pixels of the spatial optical modulator, shown as a, b and c in FIG. 2. A control circuit CC controls the pixels a, b and c so that only one pixel at a time is transmissive in a cyclically repeating pattern which is common to all sets of three pixels in front of respective detector elements (E).

A microlens array 4, comprising a two dimensional array of plano-convex spherically converging lenses L, has the effect of mapping an object onto the array of underlying detector elements E, with a spatial resolution equivalent to the diameter of each microlens. Angular demultiplexing is achieved, as shown in FIG. 2 by schematic ray representations, since light from three discrete angular bands reaches the detector element E by way of the three different liquid crystal pixels a, b and c, respectively.

The liquid crystal layer spatially modulates incoming polarized light by application of suitable voltages across different spatial elements of this layer and by incorporation of an integrated polarizer, either by use of a pleochroic dye within the liquid crystal layer or by use of an integrated modulator/polarizer pad consisting of metal fingers. The liquid crystal array is controlled electronically by the control circuit CC so as to provide sequential shuttering of the sub-pixels of each microlens element in the sequence a, b, c; a, b, c; ... This is represented in FIG. 2, in which element c is transmissive, and elements a and b are absorptive, and only a pencil A of light is transmitted to the detector element E.

This sequential shuttering results in differing parallax views being presented to the detector plane 1, and this angular demultiplexing, which is an angular to temporal conversion, is the basis for a three dimensional camera or microscope system. The benefits obtained from this imaging system depend on the angular range of the incoming information, i.e. the size of the semi-angle subtended at the detector array from individual points on the object. Certainly the angles subtended at the detector plane should be sufficient for three dimensional microscopy, as shown schematically in FIG. 3.

A processing and memory circuit PCM is connected to the detector plane 1. The circuit FCM processes to the sequentially generated two dimensional image data from the detector elements E in any desired manner and stores the result as data representing a three dimensional image.

In the example of FIGS. 1 and 2, there are three pixels of the spatial optical modulator for every pixel of the detector plane, providing three two dimensional views with single parallax; clearly other ratios, with single or full parallax, are obtainable. The type of liquid crystal used is determined partly by the required video rate of capture of the images, and for the three dimensional microscopy example shown in FIG. 1 and 2 it is anticipated that regular twisted nematic liquid crystal (TN-LC) or other liquid crystal alignments such as nematic c cells can be used. For faster video rates, ferroelectric liquid crystal (FLC) may be required.

Also a nematic liquid crystal based device operating in the White-Taylor mode (disclosed by D. White and G. Taylor in J. Appl. Phys. Vol 45 pp 4718–4723, 1974) could be used to the same effect but with unpolarized input light. The zero voltage state is a highly twisted structure induced by doping a nematic with a chiral additive. Depending on the pitch and birefringence of the liquid crystal material, this layer can absorb unpolarized light and therefore act as a shutter. For positively uniaxial liquid crystals, application of a voltage reorients the liquid crystal layer such that the absorption is reduced to a minimum.

By disposing more than one detector behind each lens, the spatial resolution of the sensor can be sacrificed in favour of a larger number of two dimensional views or, for the same number of views, the number of temporally multiplexed frames can be reduced by simultaneously capturing more than one view.

The microlens array 4 provides two dimensional parallax. However, where only one dimensional parallax is required, the microlens array may be replaced by a lenticular screen comprising cylindricaily converging elements arranged parallel to each other with regular spacing.

FIG. 4 shows another embodiment of the invention in which a sensor 12 of the type illustrated in FIGS. 1 and 2 is used with another shutter arrangement, namely a relatively low resolution shutter element 5, i.e. spatial optical modulator, disposed immediately adjacent another optical imaging system in the form of a thin microscope lens 6. The shutter element 5 divides the input aperture of the lens 6 into a number of bands or areas, and examples of these areas are shown in FIG. 5: for single parallax, the areas are strips arranged in a single row; for full parallax, they are arranged in a two dimensional array. This allows a number of different views of the object with different parallax, to be taken sequentially by moving the shutter across the optical beam, and sequentially recording frames of the image obtained on the CCD array or other detector array. The output is then processed for three dimensional display.

As shown in FIG. 4, the shutter element 5 is placed at the lens surface for a thin lens but, in the case of a well corrected compound lens, it may be positioned further up the optical system at the location of an image of the aperture, where aperture stops may already be provided.

The combination of the shutter element 5 and the sensor 12 allows an improved contrast ratio to be achieved since unwanted light has to pass through two shuttering elements (element 5 and the liquid crystal cell 3 within the sensor 12). Furthermore, if the shutter element 5 defines shutters along a first direction, and the liquid crystal cell 3 defines shutters along a second direction perpendicular to the first direction, two dimensional (i.e. full) parallax can be achieved without having to fabricate a two dimensional shutter 5.

In a third example of the invention, useful for taking images of a large angular range in a three dimensional camera 7, a plurality, in this case three, similar systems 8–10 are provided, separated spatially as shown in FIG. 6. Each system is similar to the system shown in FIG. 4 having its own objective lens, shutter element and detector array of the type illustrated in FIGS. 1 and 2, and each produces simultaneously a different view of the same object. Each is shuttered sequentially, as described with reference to FIGS. 4 and 5. This provides the three dimensional camera with a large number of views over a limited field of view, without requiring individual cameras and detectors for each view, and it is particularly appropriate in scenes where the perspective changes rapidly with angle, for example scenes with several objects in line with the camera 7.

The spatial optical modulator could be used as a novelty filter, to record only changes in the image; thus the image data for different two dimensional views with different parallax can be compressed, by determining only the differences between these views. The use of the electro-optical device as a novelty filter is described in our co-pending patent application referred to above: briefly, the spatial optical modulator is modulated with a first image, and a second image is transmitted through the spatial optical modulator so that only differences between the first and second images are detected by the detector array.

The microscope shown in FIG. 4 may be further modified by replacing the sensor 12 with a photodetector array (i.e. the microlens array 4 and the pixellated liquid crystal layer 3 are omitted). Thus the angular demultiplexing is performed by the shutter element 5. In such a microscope, both the image and object planes of the lens 6 are located at a finite distance from the lens 6 and the distance between the lens 6 and the detector array is greater than the focal length of the lens 6.

What is claimed is:

1. A three dimensional imaging apparatus comprising:
   a photodetector;
   an optical imaging system for imaging an object onto the photodetector;
   a spatial optical modulator interrupting an optical path at a location between the object and the photodetector; and
   a control circuit for causing the spatial optical modulator selectively to transmit only a selected segment of an area of the optical path at the location, the selected segment being selected sequentially among segments across the area so that the spatial optical modulator acts as a shutter arrangement,
   wherein the optical imaging system comprises an array of lenses, the photodetector comprises an array of photodetector elements, each lens of the array is optically aligned with at least one of the photodetector elements, and the spatial optical modulator comprises an array of shutters, each of which is optically aligned with a respective one of the photodetector elements, and wherein each of the shutters comprises a plurality of discrete independently controllable modulation elements for obtaining parallax viewing information of the object in the form of multiple two dimensional views at different angles from the object.

2. An apparatus as claimed in claim 1, wherein the spatial optical modulator is disposed between the array of lenses and the photodetector.

3. A camera comprising a plurality of apparatuses, each of which is as claimed in claim 1, and a circuit for processing a sequence of signals from the photodetector elements so as to store a three dimensional image.

4. An apparatus as claimed in claim 1, wherein the modulation elements are arranged in a single row so as to provide parallax viewing in one dimension.

5. An apparatus as claimed in claim 1, wherein the modulation elements are arranged in a two dimensional array so as to provide parallax viewing in two dimensions.

6. An apparatus as claimed in claim 1, wherein the spatial optical modulator is a liquid crystal device.

7. An apparatus as claimed in claim 1, wherein the spatial optical modulator and the photodetector are formed on a substrate as part of an integrated electro-optical device.

8. An apparatus as claimed in claim 7, wherein the control circuit is part of the integrated device.

9. An apparatus as claimed in claim 1, further comprising another optical imaging system disposed between the object and the optical imaging system.

10. An apparatus as claimed in claim 9, further comprising another shutter arrangement disposed adjacent the another optical imaging system.

11. An apparatus as claimed in claim 10, wherein the another shutter arrangement comprises a liquid crystal device.

12. An apparatus as claimed in claim 10, wherein the spatial optical modulator defines an array of modulation elements along a first direction, and the another shutter arrangement defines an array of shutters along a second direction perpendicular to the first direction.

13. A microscope comprising an apparatus as claimed in claim 1, and a circuit for processing a sequence of signals from the photodetector elements so as to store a three dimensional image.

14. A camera comprising an apparatus as claimed in claim 1, and a circuit for processing a sequence of signals from the photodetector elements so as to store a three dimensional image.

15. A three dimensional imaging microscope comprising:
    a photodetector array;
    a microscope lens for imaging an object onto the photodetector array;

a spatial optical modulator located in substantially a same plane of the microscope lens and including a plurality of independently controllable modulation elements for interrupting an optical path between the object and the photodetector array; and a control circuit for causing the spatial optical modulator selectively to transmit only a selected segment of an area of the optical path at the spatial optical modulator, the selected segment being selected sequentially among segments across the area so that the spatial optical modulator acts as a shutter arrangement to obtain parallax viewing information of the object, an object plane and an image plane of the lens being at finite distances from the lens.

16. A microscope as claimed in claim 15, wherein the spatial optical modulator is a liquid crystal device including a plurality of shutters, and wherein the shutters are arranged in a single row so as to provide parallax viewing in one dimension or are arranged as a two dimensional array so as to provide parallel viewing in two dimensions.

* * * * *